(12) United States Patent
Yashima

(10) Patent No.: US 7,890,775 B2
(45) Date of Patent: Feb. 15, 2011

(54) INFORMATION PROCESSING APPARATUS, CONTENT CONTROL METHOD, AND STORAGE MEDIUM

(75) Inventor: Daisuke Yashima, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/500,736

(22) Filed: Jul. 10, 2009

(65) Prior Publication Data

US 2010/0011180 A1    Jan. 14, 2010

(30) Foreign Application Priority Data

Jul. 14, 2008    (JP)    ............... 2008-183150

(51) Int. Cl.
G06F 12/14    (2006.01)
(52) U.S. Cl. .................................... 713/193
(58) Field of Classification Search ........... None
See application file for complete search history.

(56) References Cited

U.S. PATENT DOCUMENTS

| | | | | |
|---|---|---|---|---|
| 2002/0057799 A1* | 5/2002 | Kohno | ............ | 380/228 |
| 2006/0059101 A1* | 3/2006 | Ebihara et al. | ............ | 705/59 |
| 2006/0077825 A1* | 4/2006 | Nonaka et al. | ............ | 369/47.12 |
| 2009/0022320 A1* | 1/2009 | Furukawa et al. | ............ | 380/278 |
| 2009/0119350 A1* | 5/2009 | Yamaguchi et al. | ............ | 707/204 |

FOREIGN PATENT DOCUMENTS

| | | |
|---|---|---|
| JP | 07-221751 | 8/1995 |
| JP | 11-259964 | 9/1999 |
| JP | 2002-082918 | 3/2002 |
| JP | 2002-163577 A | 6/2002 |
| JP | 2002-190795 A | 7/2002 |
| JP | 2003-242038 | 8/2003 |
| JP | 2003-339000 | 11/2003 |
| JP | 2004-54473 A | 2/2004 |
| JP | 2004-112788 | 4/2004 |
| JP | 2005-092983 | 4/2005 |
| JP | 2005-136527 | 5/2005 |
| JP | 2005-149677 | 6/2005 |
| JP | 2005-174199 | 6/2005 |
| JP | 2005-174200 | 6/2005 |
| JP | 2005-202935 | 7/2005 |
| JP | 2006-065503 | 3/2006 |
| JP | 2006-099329 | 4/2006 |
| JP | 2006-185473 | 7/2006 |
| JP | 2006-314022 | 11/2006 |
| JP | 2006-527455 | 11/2006 |
| JP | 2006-338847 | 12/2006 |

(Continued)

OTHER PUBLICATIONS

ADSD-CPRM: Flexible Protection for Digital Content, White Paper, Aug. 2007.

(Continued)

*Primary Examiner*—David J Pearson
(74) *Attorney, Agent, or Firm*—Patterson & Sheridan, LLP

(57) ABSTRACT

According to one embodiment, a storage medium configured to be connectable to apparatuses for processing an encrypted content, the medium stores a content key of the encrypted content, and a copy control list includes information indicating one of the apparatuses which is a copying destination of the encrypted content.

5 Claims, 5 Drawing Sheets

| Connection destination ID | Copy schedule | Copy-finished | Copy date/time | Path in connection destination apparatus | Auto delete |
|---|---|---|---|---|---|
| 00000 | "0" | "0" | | ¥ | "1" |
| 00001 | "0" | "1" | 2008/4/1 | ¥Movie¥ | – |
| 00002 | "1" | "0" | | | – |
| 00003 | "0" | "1" | 2008/5/1 | ¥ | – |
| 00004 | "0" | "0" | | | – |
| 00005 | "1" | "0" | | | – |
| 00006 | "1" | "0" | | | – |
| ... | | | | | – |

24i

FOREIGN PATENT DOCUMENTS

| | | |
|---|---|---|
| JP | 2007-270744 | 10/2007 |
| JP | 2007-288557 | 11/2007 |
| JP | 2007-537500 | 12/2007 |
| JP | 2008-085683 | 4/2008 |
| JP | 2008-092075 | 4/2008 |
| JP | 2009-194879 | 8/2009 |
| WO | WO-01-093136 | 12/2001 |

OTHER PUBLICATIONS

Japanese Office Action dated Oct. 6, 2009, Japanese Patent Application No. 2008-183150 (with English translation).

* cited by examiner

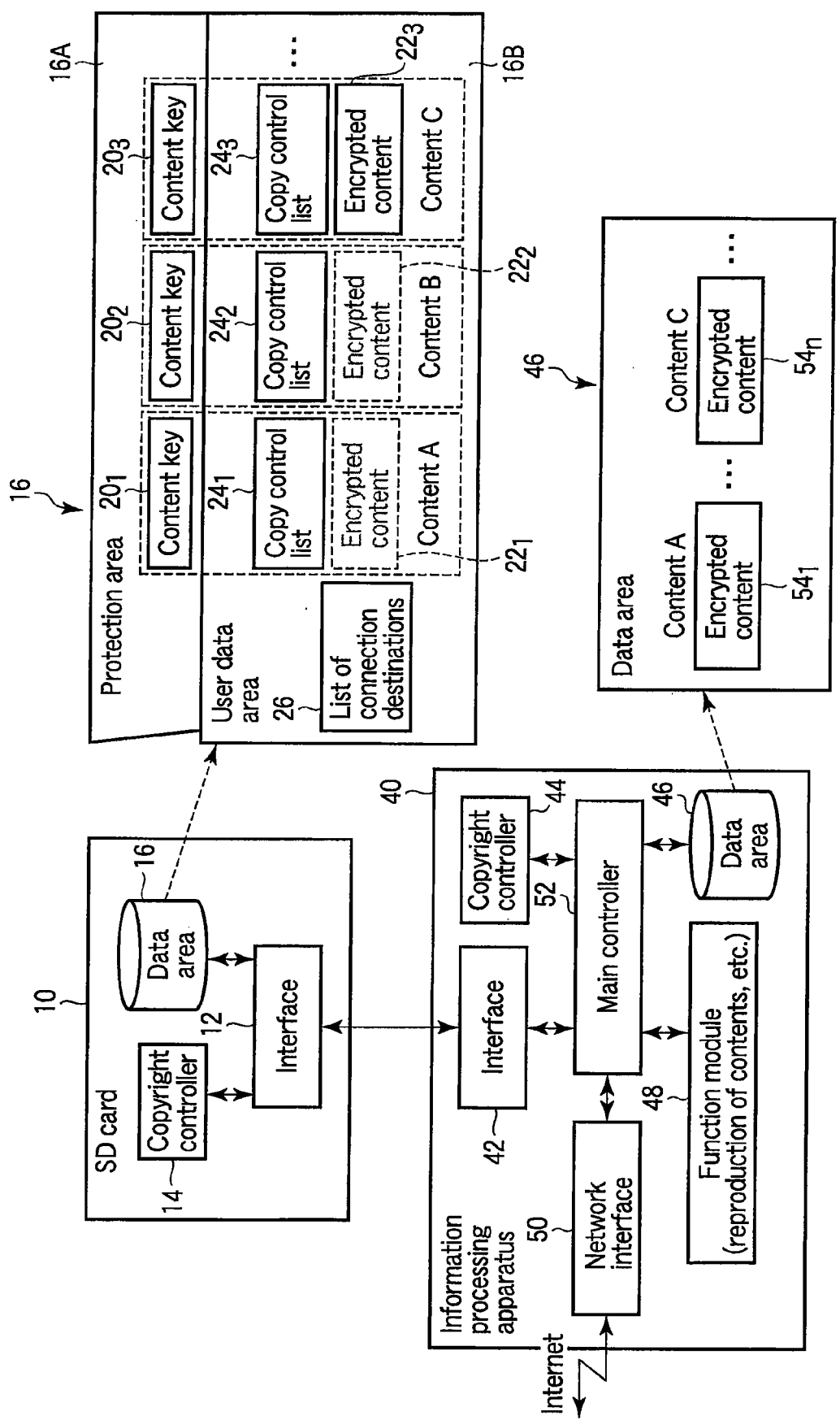
F I G. 1

24i

| Connection destination ID | Copy schedule | Copy-finished | Copy date/time | Path in connection destination apparatus | Auto delete |
|---|---|---|---|---|---|
| 00000 | "0" | "0" | | ¥ | "1" |
| 00001 | "0" | "1" | 2008/4/1 | ¥Movie¥ | - |
| 00002 | "1" | "0" | | | - |
| 00003 | "0" | "1" | 2008/5/1 | ¥ | - |
| 00004 | "0" | "0" | | | - |
| 00005 | "1" | "0" | | | - |
| 00006 | "1" | "0" | | | - |
| ... | | | | | - |

F I G. 2

26

| Connection destination ID | Label | Last access date/time | Remaining storage space (GB) | Copy schedule flag (default) |
|---|---|---|---|---|
| 00000 | Own SD card | 2008/4/8 | 3 | "0" |
| 00001 | Car navigation | 2008/5/17 | 30 | "1" |
| 00002 | Cellular phone | 2007/11/14 | 15 | "1" |
| 00003 | MP3 player | 2007/11/14 | 2 | "0" |
| 00004 | HDD recorder | 2008/3/1 | 100 | "1" |
| 00005 | Other SD card | 2008/4/4 | 1 | "0" |
| 00006 | Portable video | 2008/2/16 | 13 | "1" |
| ... | | | | |

F I G. 3

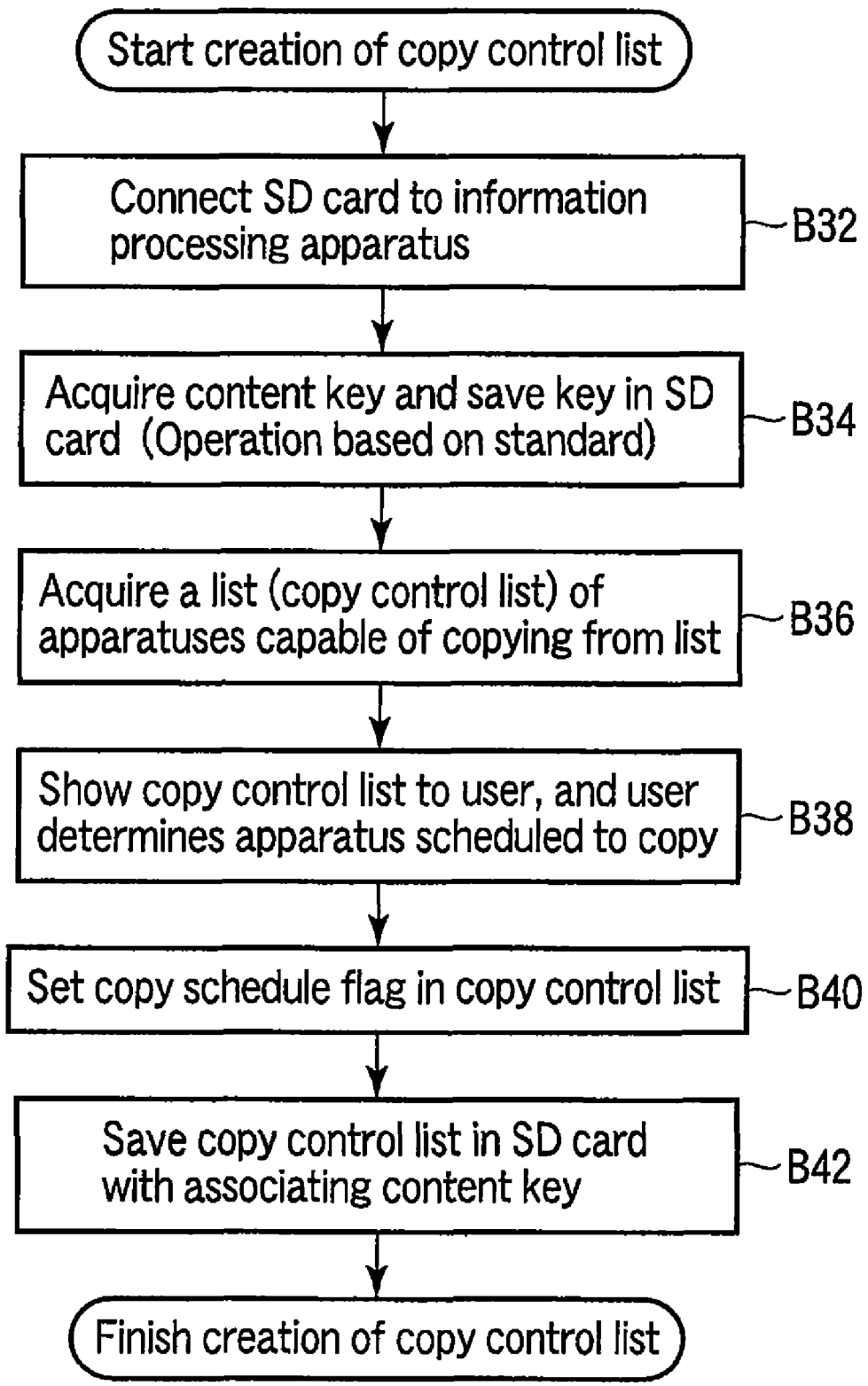
F I G. 5

US 7,890,775 B2

INFORMATION PROCESSING APPARATUS, CONTENT CONTROL METHOD, AND STORAGE MEDIUM

CROSS-REFERENCE TO RELATED APPLICATIONS

This application is based upon and claims the benefit of priority from Japanese Patent Application No. 2008-183150, filed Jul. 14, 2008, the entire contents of which are incorporated herein by reference.

BACKGROUND

1. Field

One embodiment of the invention relates to an information processing apparatus, which separately controls encrypted content and a key used for encrypting content (hereinafter, called a content key), a content control method, and a storage medium.

2. Description of the Related Art

In recent years, secure digital separate delivery (SDSD)-content protection for recordable media (CPRM) has been proposed as an expanded standard of a secure digital (SD) memory card (hereinafter, called an SD card) to realize sharing and protection of digital content (e.g., SDSD-CPRM: Flexible Protection for Digital Content, White Paper, August 2007 (Document 1)). This document separately handles encrypted content and a content key, which have been handled together most times.

Encrypted content and a content key are distributed, or copied through various routes. For example, encrypted content and a content key are stored together in an SD card, or only a content key is stored in an SD card. For using (reproducing) encrypted content, secure means such as authentication of a key and decryption by using cryptographic technology are required, and restrictions are provided. However, encrypted content itself can be freely distributed. This enables sharing of content.

A content key is never distributed to apparatus. For decryption and reproduction of encrypted content, it is necessary to insert an SD card including a content key corresponding to encrypted content into apparatus for reproducing encrypted content. Therefore, the same encrypted content distributed to various devices can be used at various places by carrying an SD card only.

This standard assumes that a content key is collectively controlled, while encrypted content is distributed to two or more devices. However, this standard defines nothing about collective control of the devices, to which encrypted content is distributed, or copied.

A document 2 (Jpn. Pat. Appln. KOKAI Publication No. 2002-163577) describes that a personal computer having encrypted content and a license acquired from a distribution server through the Internet performs check-out for lending the encrypted content and license to a memory card inserted into a cellular phone connected through a USB cable, and performs check-in for returning the lent encrypted content and license.

The SDSD-CPRM standard described in the document 1 does not define the control of a distribution destination, or a copying destination, when encrypted content is distributed through an SD card. The document 2 describes that content and license are distributed together, but does not define separate distribution of content and license.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a diagram showing a configuration of a content distribution system, realizing a content control method according to a first embodiment of the invention;

FIG. 2 is a table showing an example of a copy control list stored in a user data area of the SD card in the first embodiment;

FIG. 3 is a table showing an example of a list of connection destinations stored in a user data area of the SD card in the first embodiment;

FIG. 5 is a flowchart showing an example of creation of the copy control list in the first embodiment.

DETAILED DESCRIPTION

Figure 4:
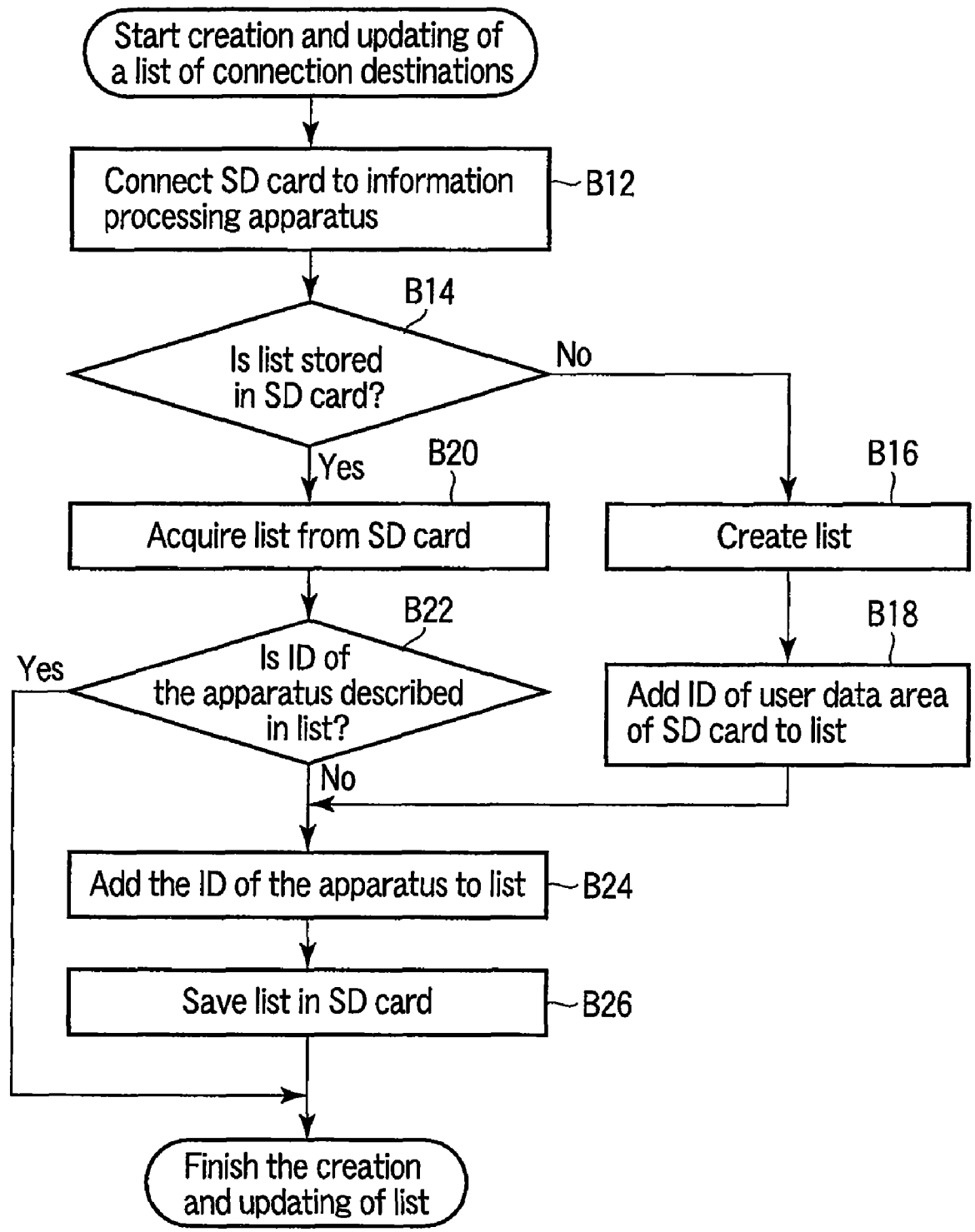
FIG. 4 is a flowchart showing an example of creation and updating of the list of connection destinations in the first embodiment.

Various embodiments according to the invention will be described hereinafter with reference to the accompanying drawings. In general, according to one embodiment of the invention, a storage medium configured to be connectable to apparatus for processing an encrypted content, the medium storing a content key of the encrypted content, and a copy control list comprising information indicating a copying destination apparatus of the encrypted content.

FIG. 1 is a diagram showing a configuration of a content distribution system, which realizes a content control method according to a first embodiment of the invention. The system comprises an SD card 10 as an example of a storage medium, and information processing apparatus 40 as a content reproducing apparatus connected to the SD card 10.

The SD card 10 includes an interface 12, a copyright controller 14, and a data area 16. This configuration conforms to the SD card standards, and the copyright controller 14 satisfies the SDSD-CPRM standards. The data area 16 is divided into small areas. A protection area 16A and a user data area 16B are related to this embodiment. The protection area 16A stores content keys $20_1$, $20_2$, . . . used for encrypting each content, in the protected state conformable to the CPRM standard. The protection area 16A is usually an area inaccessible by a user, and is exceptionally accessible only for protection of copyright in an authorized procedure. The user data area 16B stores a content $22_i$ (i=1, 2, . . . ) encoded with a content key $20_i$ stored in the protection area 16A. However, as the SDSD-CPRM standard permits separate control of a content key and an encrypted content, even if the content key $20_i$ is stored in the protection area 16A, a corresponding encrypted content $22_i$ is not necessarily stored in the user data area 16B.

The data structure described above is defined by the SD card and SDSD-CPRM standards. In this embodiment, the user data area 16B stores copy control lists $24_1$, $24_2$, . . . corresponding to the content key $20_i$ stored in the protection area 16A for each content. The copy control list $24_i$ and content key $20_i$ are stored in different areas (the user data area 16B and protection area 16A), but they are mapped by a content ID, etc., and correlated. The copy control list $24_i$ controls processing schedules and states for two or more pieces of information processing apparatus (connection destinations), to which the SD card 10 is connected. FIG. 2 shows an example of the copy control list $24_i$. A copy schedule flag, a copy-finished flag, copy date and time, a path in a destination, and an automatic deletion flag can be set for each destination. A special ID (here, 00000), which assumes the user data area 16B of the SD card 10 to be one of the connection destination apparatus (a copying destination), is assigned to the user data area 16B. An automatic deletion flag can be set only for the user data area 16B (the connection destination apparatus ID=00000) of the SD card 10. A path in a connection destination saves a path storing or scheduled to store a path actually storing an encrypted content of a data area of each connection destination.

Though it is not essential for the configuration of the embodiment, the user data area 16B stores a list of connection destinations 26. The list 26 stores an ID (a connection destination ID) of information processing apparatus, which was connected to the SD card 10 in the past, or has the possibility of connection to the SD card. In the copy control list $24_i$, the information can be simplified by using the connection destination IDs in the list of connection destinations 26.

FIG. 3 shows an example of the list of connection destinations 26. The list 26 includes a label indicating an apparatus name, together with a connection destination ID. This makes it easy to confirm an apparatus name when the list of connection destinations 26 is displayed. Further, the list 26 stores date and time of the last access to a connection destination, and the remaining storage space in the last accessed apparatus. These pieces of information are useful for determining an apparatus to receive a copy of encrypted content.

In a configuration not using the list of connection destinations 26, all information to be stored in the list 26 are stored in an individual copy control list $24_i$. In confirmation of existing connection destinations for creating a new copy control list, acquire the connection destination IDs by referring to an already-created copy control. In the following description, the SD card 10 is assumed to have the list of connection destinations 26.

Next, the configuration of the information processing apparatus 40 is explained. The information processing apparatus 40 includes an interface 42 corresponding to the interface of SD card, a copyright controller 44 conformable to the SDSD-CPRM standard, a data area 46, a function module 48 to reproduce content, a network interface 50 corresponding to networks, such as the Internet, and a controller 52. The SDSD-CPRM standard assumes that the data area 46 of the information processing apparatus 40 connectable to the SD card 10 stores an encrypted content $54_i$ (a copy of the encrypted content $22_i$) encrypted with the content key $20_i$ in the SD card 10. For example, when data is reproduced, the SD card 10 is authenticated and a key is exchanged as a routine procedure defined in the SDSD-CPRM standard, the content key $20_i$ is acquired from the SD card 10, the encrypted content $54_i$ is decrypted by using the key $20_i$, and the data is reproduced.

In this embodiment, a specific method of using or reproducing content is not defined, and all operations conform to the SDSD-CPRM standard. An explanation will be given of a control method based on the copy control list $24_i$ for the content stored in the SD card 10, for copying encrypted content from the SD card 10 to the information processing apparatus 40, and reverse-copying from the information processing unit 40 to the SD card 10. This control method has the following six functions.

(1) Creating and Updating a List of Connection Destinations

When the SD card 10 is connected to the information processing apparatus 40 (inserted into a card slot), the information processing apparatus 40 refers to the list of connection destinations 26 in the SD card 10. When the list of connection destinations 26 is not stored, a new list 26 is created. When a new list of connection destinations 26 is created, a special ID, which assumes the user data area 16B of the SD card 10 to be one of the apparatuses as a connection destination (a copying destination), is assigned to the user data area 16B, and is described in the list of connection destinations 26. When the list of connection destinations 26 is stored, but a connection destination ID indicating the corresponding information processing apparatus 40 is not described, a new ID of the apparatus 40 is created and described in the list.

(2) Acquiring Content and Creating a Copy Control List

When the information processing apparatus 40 newly acquires content protected by the SDSC-CPRM standard, the SDSD-CPRM standard defines only writing of a content key of the content into the SD card 10, and does not define a method of storing the encrypted content. In this embodiment, when content is newly acquired, and a corresponding content key is acquired, a copy control list $24_i$, which indicates a distribution destination of encrypted content and states of a distribution destination apparatus, is created and stored in an SD card. As shown in FIG. 2, the copy control list $24_i$ includes a copy schedule flag and a copy-finished flag for each connection destination apparatus described in the list of connection destinations 26. A copy schedule flag is set when the copy control list $24_i$ is created. A copy schedule flag may be evenly set for all apparatuses described in the list of connection destinations 26, or may be set only for a default apparatus previously set by the user. In the case of default setting, the list of connection destinations 26 includes the information for default setting, as shown in FIG. 3. When writing acquired encrypted content into the SD card 10, the information processing apparatus 40 clears a copy schedule flag of the SD card 10 in the copy control list $24_i$ corresponding to the content $22_i$, and sets a copy-finished flag instead.

(3) Copying to a Connection Destination Apparatus

When the SD card 10 is inserted, the information processing apparatus 40 first creates and updates the list of connection destinations 26 described in the above (1). Then, the information processing apparatus 40 refers to the copy control list $24_i$ corresponding to a content as a copy target in the SD card 10, and copies encrypted content from the SD card 10 to the corresponding apparatus 40, if the corresponding apparatus 40 is listed as a scheduled copy destination apparatus (encrypted content is not stored in the apparatus), and the encrypted content is stored in the SD card 10. And, the information processing apparatus 40 clears its own copy schedule flag in the copy control list $24_i$, and sets a copy-finished flag instead.

(4) Copying to the SD Card

When the SD card 10 is inserted, the information processing apparatus 40 first creates and updates the list of connection destinations 26 described in the above (1). Then, the information processing apparatus 40 refers to the copy control list $24_i$ corresponding to the content as a copying target in the SD card 10, and copies encrypted content from the corresponding apparatus 40 to the SD card 10, if an apparatus (including the SD card 10) other than the corresponding apparatus 40 is listed as a scheduled copy destination apparatus, and the encrypted content is stored in the corresponding apparatus 40. And, the information processing apparatus 40 clears a copy schedule flag of the SD card 10 in the copy control list $24_i$, if it is set, and sets a copy-finished flag instead.

(5) Automatic Deletion

When a certain encrypted content is copied from the SD card 10 to the information processing apparatus 40, and the information processing apparatus 40 sets its own copy-finished flag in the copy control list $24_i$ in the SD card 10, the encrypted content is automatically deleted from the SD card 10, if it is detected that no apparatus is set, when the apparatus 40 refers to copy schedule flags of other connection destination apparatuses. The automatic deletion function may be turned on/off by the user's setting. Encrypted content may also be deleted after the user's consent is obtained by previously informing the user of the deletion.

(6) Updating a Copy Control List

The information processing apparatus 40 refers to the copy control list $24_i$ in the SD card 10, and sets the own copy-finished flag of the apparatus 40 if any encrypted content is stored in the apparatus 40 and the own copy-finished flag is not set in the copy control list $24_i$, and clears the copy-finished flag if a copy schedule flag is set.

Now, a detailed explanation will be given of the above function (1) Creating and updating a list of connection destinations 26 with reference to the flowchart of FIG. 4.

When the SD card 10 is connected to the information processing apparatus 40 (inserted into a card slot) (block B12), the information processing apparatus 40 determines whether the list of connection destinations 26 is stored in the SD card 10 (block B14). When the list of connection destinations 26 is not stored (No in block B14), the information processing apparatus 40 creates a new list of connection destinations 26 (block B16), and adds an ID (here, 00000) indicating the user data area 16B of the SD card 10 and its label, to the connection destination ID in the list of connection 26 (block B18). The label may be previously set for each apparatus, or may be set by the user. The ID of the user data area 16B of the SD card 10 is added as a connection destination for the purpose of controlling the user data area 16B of the SD card 10 in the copy control list $24_i$, as is the connection destination. This makes it possible to copy encrypted content from the information processing apparatus 40 to the SD card 10, and to copy encrypted content from the information processing apparatus 40 to other apparatuses through the SD card 10. Further, it is unnecessary to define an ID to identify two or more SD cards 10, and it is sufficient to identify only the user data area 16B of the SD card 10 including a list of connection destinations 26. Some types of information processing apparatus 40 have two or more storage units. In such a case, different IDs are added to the storage units as connection destinations, and they are added to the list of connection destinations 26.

When the list of connection destinations 26 is stored in the SD card 10 (Yes in block B14), the information processing apparatus 40 acquires the list of connection destinations 26 from the SD card (block B20), and determines whether the own ID of the apparatus 40 is described as a connection destination (block B22). When the own ID of the apparatus 40 is described (Yes in block B22), the operation is terminated. When the own ID of the apparatus 40 is not described (No in block B22), or after the operation of block B18 is finished, the apparatus 40 adds its own ID and its label to the connection destination IDs in the list of connection destinations 26, and updates the list 26 (block B24). Then, the apparatus 40 saves the updated list of connection destinations 26 in the SD card 10 (block B26)

Next, a detailed explanation will be given of creation of a copy control list in the function (2) Acquiring content and generating a copy control list with reference to the flowchart of FIG. 5.

After the SD card 10 is connected to the information processing apparatus 40 (inserted into a card slot) (block B32), the information processing apparatus 40 acquires encrypted content or the right of using encrypted content. When the information processing apparatus 40 controls the content in the SD card 10 by using the SDSD-CPRM standard, the apparatus 40 acquires a content key, and writes a content key $20_i$ of the corresponding content in the protection area 16A of the SD card 10 (block B34). At this time, the content encrypted by the content key may be written on the user data area 16B of the SD card 10, but this is not essential.

The information processing apparatus 40 acquires the list of connection destinations 26 from the user data area 16B of the SD card 10, and acquires a list of apparatuses capable of copying encrypted content from a connection destination ID (block B36). Then, the apparatus 40 shows the list to the user, and determines the copy destination apparatus by the user's choice (block B38). A default destination may be previously determined without requesting the user's choice, for example, copying to all apparatuses described in the list.

When a copy destination apparatus is determined, the information processing apparatus 40 creates the copy control list $24_i$, and sets a copy schedule flag in the column of the connection destination ID corresponding to the copy destination apparatus (block B40). Finally, the information processing apparatus 40 saves the copy control list $24_i$ in the user data area 16B of the SD card 10, by associating with the content key (block B42). As shown in the flowchart of FIG. 4, when the data area 16B itself of the SD card 10 is included as a connection destination in the list of connection destinations 26, whether encrypted content is stored in the SD card 10 is easily detected in the copy control list $24_i$.

Figure 6:
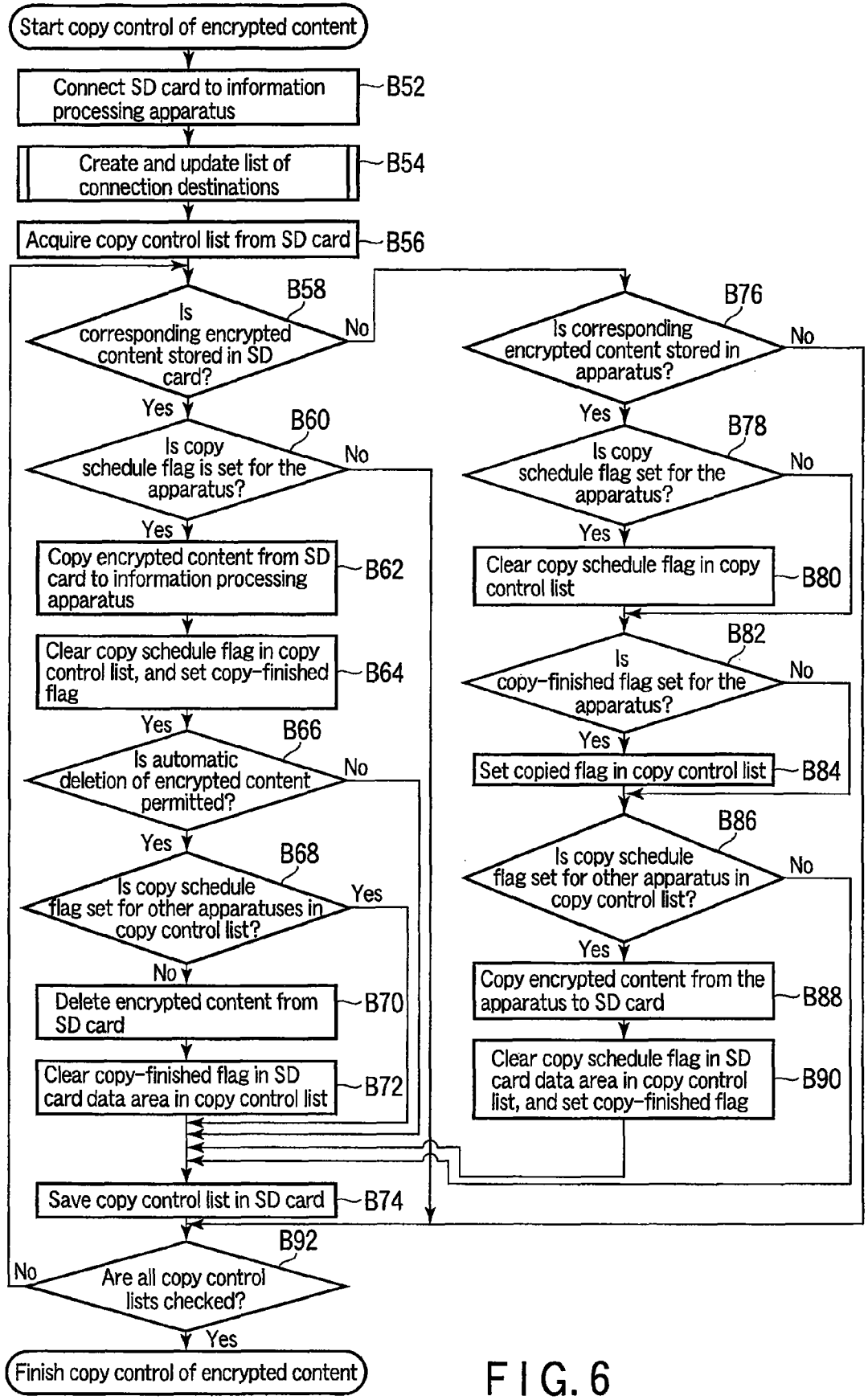
FIG. 6 is a flowchart showing an example of copy control of encrypted content in the first embodiment.

Next, a detailed explanation will be given of the functions (3) Copying encrypted content to a connection destination apparatus, (4) Copying to the SD card 10, (5) Automatic deletion, and (6) Updating a copy control list with reference to the flowchart of FIG. 6.

When the SD card 10 is connected to the information processing apparatus 40 (inserted into a card slot)(block B52), the information processing apparatus 40 performs the function of creating and updating a list of connection destinations 26 (FIG. 4) (block B54), and acquires the copy control list $24_i$ for a certain content from the SD card 10 (block B56). The information processing apparatus 40 refers to the copy control list $24_i$, and determines whether the encrypted content $22_i$ is stored in the user data area 16B of the SD card 10 (block B58). This can be determined by checking whether or not a copy-finished flag corresponding to the ID (here, 00000) indicating the user data area 16B of the SD card 10 is set.

When the encrypted content is stored in the SD card 10, the information processing apparatus 40 determines whether or not its own copy schedule flag is set (block B60). When the encrypted content is stored in the SD card 10 and the own copy schedule flag is set (Yes in block B60), the information processing apparatus 40 copies the encrypted content from the SD card 10 to the information processing apparatus (block B62), clears the own copy schedule flag, and sets a copy-finished flag instead (block B64).

When the encrypted content is copied from the SD card 10 to the information processing apparatus 40, the apparatus 40 automatically deletes the encrypted content from the SD card 10. First, the information processing apparatus 40 determines whether or not this operation is permitted (block B66). This can be determined by checking whether the automatic deletion flag of the copy control list $24_i$ shown in FIG. 2 is set or cleared. Thus, if the user does not want to clear the encrypted content from the SD card 10 after completion of copying to all scheduled apparatuses, the user may clear the automatic deletion flag in the copy control list $24_i$ in the SD card 10. As the copy control list $24_i$ is provided for each content, permission/not-permission of the automatic deletion can be set for each content. When the automatic deletion is permitted (Yes in block B66), the information processing apparatus 40 determines whether a copy schedule flag is set for other apparatuses (block B68). When a copy schedule flag is set for other apparatuses (No in block B68), the information processing apparatus 40 deletes the encrypted content from the SD card 10 (block B70). Then, the information processing apparatus 40 clears the copy-finished flag corresponding to the ID indicating the user data area 16B of the SD card 10 in the copy control list $24_i$ (block B72). The copy control list $24_i$ updated as described above is saved in the SD card 10 (block B74). If a copy schedule flag is set for other apparatuses (Yes in block B68), blocks B70 and B72 are skipped, and the updated copy control list $24_i$ is saved in the SD cared 10 in block B74.

When confirming nonexistence of the encrypted content $22_i$ in the SD card 10 in block B58, the information processing apparatus 40 determines whether the encrypted content $22_i$ is stored in the apparatus 40 (block B76). This cannot be determined from the copy control list $24_i$, and needs to check whether the encrypted content is stored in the storage of the apparatus itself. When the encrypted content is stored in the apparatus (Yes in block B76), the apparatus 40 determines whether its own copy schedule flag is set in the copy control list $24_i$ (block B78). If the own copy schedule flag is set (Yes in block B18), the apparatus 40 clears it (block B80). Likewise, the apparatus 40 determines whether its own copy-finished flag is set in the copy control list $24_i$ (block B82). If the own copy-finished flag is not set (Yes in block B82), the apparatus 40 sets its own copy-finished flag (block B84). Such a discrepancy in the presence or absence of a flag in the copy control list $24_i$ and encrypted content may occur when the apparatus acquires encrypted content on the Internet, not without using the SD card 10.

Then, the information processing apparatus 40 determines whether a copy schedule flag of an apparatus other than the apparatus is set in the copy control list $24_i$ (block B86). If a copy schedule flag other then the apparatus is set, the information processing apparatus 40 copies encrypted content to the other apparatus, so that the content can be copied from the SD card 10 to the other apparatus (block B88). Then, the information processing apparatus 40 clears a copy schedule flag corresponding to the ID indicating the user data area of the SD card 10 in the copy control list $24_i$, and sets a copy-finished flag instead (block B90).

The copy control list $24_i$ updated as described above is saved in the SD card 10 in block B74.

The above operations are executed for the copy control list $24_i$ for all content in the SD card 10 (block B92).

According to the copying operation explained above, when the SD card 10 is connected to the information processing apparatus 40, the copying operation is executed to a scheduled copy destination previously set in the copy control list $24_i$ without requiring an instruction of a user. Therefore, even if the SD card 10 is connected to the information processing apparatus 40 for the purpose of reproducing other content, the copying operation to a scheduled apparatus can be automatically executed. This increases the convenience of distributing content through an SD card. Further, when the copying operation to all scheduled apparatuses is completed, encrypted content may be automatically deleted from an SD card. This enables the user to automatically ensure the remaining storage space of the user data area of the SD card 10, without checking the states of copying to each connection destination. Since the states of copying encrypted content in destination apparatuses are collectively controlled, the content copying operation can be automatically executed, and the user's convenience is increased.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

For example, an SD memory card is used as a storage medium in the embodiment described above. A removable hard disk, an optical disc and other kinds of storage media may be used. The SDSD-CPRM standard is used as a standard for encrypted content and distribution of content keys in the embodiment described above. The invention is applicable also to a copyright protection technology, which can separately control encrypted content and content keys. Further, encrypted content may be stored in a storage medium, which stores content keys. Any kind of storage medium may be used, as long as it has an area usable by the user for reading and writing.

The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

What is claimed is:

1. An information processing apparatus, to which a storage medium is connectable, the medium storing a content key of an encrypted content and a copy control list comprising information indicating apparatuses which are copying destinations of the encrypted content, the apparatus comprising:

an interface for connecting to the storage medium;

a module configured to save the content key in the medium;

a module configured to select one of destinations from a list of connection destinations; and a module configured to update the copy control list stored in the medium by creating a copy schedule flag relating to an apparatus corresponding to the one of the destinations selected by the select module, wherein the copy control list further comprises information identifying the medium, the copy schedule flag, and a copy-finished flag;

the medium further stores a list of connection destinations of the medium; and the information processing apparatus further comprises:

a module configured to detect that encrypted content is stored in the medium;

a module configured to copy an encrypted content to the medium, to clear the copy schedule flag of the apparatus and the medium in the copy control list of the encrypted content, and to set a copy-finished flag when copy schedule flags of other apparatuses are set in the copy control list of the encrypted content, the encrypted content is stored in the apparatus, and it is not detected that encrypted content is stored in the medium; and a module configured to copy the encrypted content to the apparatus, to clear the copy schedule flag of the apparatus in the copy control list of the encrypted content, and to set a copy-finished flag when the copy schedule flag of the apparatus is set in the copy control list of the encrypted content and it is detected that encrypted content is stored in the medium.

2. The apparatus of claim 1, wherein
the copy control list comprises a copy-finished flag indicating that encrypted content has been copied to a copying destination apparatus.

3. The apparatus of claim 2, further comprising:
a module configured to refer to the copy control list of the encrypted content when the encrypted content is stored in the apparatus;
a module configured to clear a copy schedule flag of the apparatus when the copy schedule flag is set in the copy control list of the encrypted content; and
a module configured to set a copy-finished flag of the apparatus when the copy-finished flag is not set in the copy control list of the encrypted content.

4. The apparatus of claim 1, further comprising:
a module configured to delete the encrypted content of the storage medium when the copy schedule flags of the other apparatuses in the copy control list of the encrypted content are cleared after the encrypted content is copied to the apparatus.

5. The apparatus of claim 4, further comprising:
a module configured to inform a user of a confirmation message before the encrypted content in the medium is deleted.

* * * * *